United States Patent
Mukai et al.

(10) Patent No.: US 10,782,683 B2
(45) Date of Patent: Sep. 22, 2020

(54) VEHICLE CONTROL DEVICE

(71) Applicant: HONDA MOTOR CO., LTD., Minato-ku, Tokyo (JP)

(72) Inventors: Takuyuki Mukai, Wako (JP); Jun Tanaka, Wako (JP); Shigehiro Honda, Wako (JP); Jun Ibuka, Wako (JP); Riho Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 15/838,623

(22) Filed: Dec. 12, 2017

(65) Prior Publication Data
US 2018/0173227 A1 Jun. 21, 2018

(30) Foreign Application Priority Data
Dec. 16, 2016 (JP) .................... 2016-244833

(51) Int. Cl.
| | |
|---|---|
| *G05D 1/00* | (2006.01) |
| *B60W 50/14* | (2020.01) |
| *B60W 50/08* | (2020.01) |
| *B60W 50/00* | (2006.01) |

(52) U.S. Cl.
CPC ....... *G05D 1/0061* (2013.01); *B60W 50/0097* (2013.01); *B60W 50/082* (2013.01); *B60W 50/14* (2013.01); *G05D 1/0088* (2013.01); *B60W 2540/00* (2013.01); *G05D 2201/0213* (2013.01)

(58) Field of Classification Search
CPC ... G05D 1/0061; G05D 1/0088; B60W 50/14; B60W 2540/00; B60W 50/0097
USPC ............................................................ 701/23
See application file for complete search history.

(56) References Cited

U.S. PATENT DOCUMENTS

2012/0046817 A1* 2/2012 Kindo ................. B60W 30/143
                                                        701/23

FOREIGN PATENT DOCUMENTS

| EP | 2919217 | 9/2015 |
| JP | 10-309961 | 11/1998 |
| JP | 2010-264829 | 11/2010 |
| JP | 2015-175824 | 10/2015 |

(Continued)

OTHER PUBLICATIONS

Japanese Office Action for Japanese Patent Application No. 2016-244833 dated Sep. 25, 2018.

(Continued)

*Primary Examiner* — Khoi H Tran
*Assistant Examiner* — Rodney P King
(74) *Attorney, Agent, or Firm* — Amin, Turocy & Watson, LLP

(57) ABSTRACT

A vehicle control device includes a takeover operation unit configured to execute operations whereby at least a portion of automated driving is handed over to manual driving performed by a driver, and a duration acquisition unit configured to acquire a duration of the automated driving when the at least a portion of the automated driving is handed over to manual driving performed by the driver. In the case that the duration is greater than or equal to a first predetermined time period, the takeover operation unit performs an operation to hand over driving to manual driving differently from an operation to hand over driving to manual driving in the case that the duration is less than the first predetermined time period.

14 Claims, 10 Drawing Sheets

(56) References Cited

FOREIGN PATENT DOCUMENTS

| | | |
|---|---|---|
| JP | 2016-091412 | 5/2016 |
| WO | 2014/073079 | 5/2014 |

OTHER PUBLICATIONS

Japanese Office Action for Japanese Patent Application No. 2016-244833 dated Jun. 26, 2018.

* cited by examiner

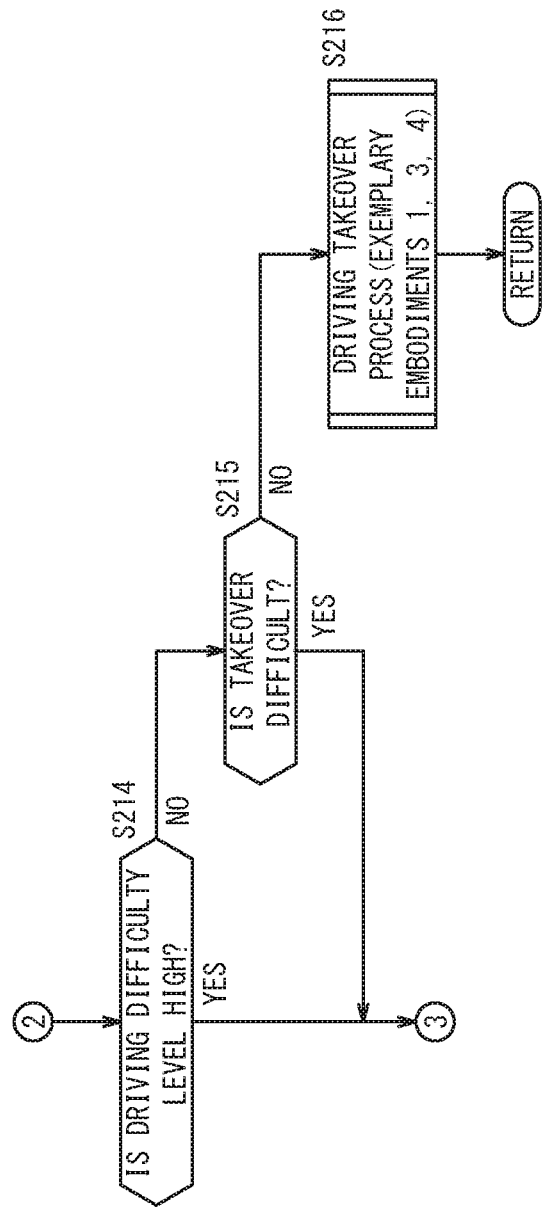

VEHICLE CONTROL DEVICE

CROSS-REFERENCE TO RELATED APPLICATION

This application is based upon and claims the benefit of priority from Japanese Patent Application No. 2016-244833 filed on Dec. 16, 2016, the contents of which are incorporated herein by reference.

BACKGROUND OF THE INVENTION

Field of the Invention

The present invention relates to a vehicle control device which carries out a travel control for a host vehicle at least partially by way of automated driving.

Description of the Related Art

Japanese Laid-Open Patent Publication No. 2015-175824 has an object of accurately determining whether or not traveling by way of an automated driving control is possible in consideration of traffic information.

In order to achieve such an object, Japanese Laid-Open Patent Publication No. 2015-175824 discloses a method of acquiring a planned travel route for a vehicle from guide routes or candidate routes, which are candidates for a recommended route, and specifying an interruption recommendation section in which a reason has occurred for interrupting an automated driving control in an automated driving segment included within the planned travel route that was acquired. In addition, traffic information in the vicinity of the interruption recommendation section is acquired, and based on the acquired traffic information, a determination is made as to whether or not traveling by way of the automated driving control is possible in the interruption recommendation section. Then, on the basis of such a determination result, an interruption section is specified in which the automated driving control is to be interrupted.

SUMMARY OF THE INVENTION

According to Japanese Laid-Open Patent Publication No. 2015-175824, traffic information of the interruption recommendation section is acquired on the premise that automated driving will be temporarily interrupted and switched over to manual driving performed by the driver. For example, in the case that automated driving is impossible in the interruption recommendation section due to weather conditions or the like for which detection of the surrounding situation is difficult with a camera, then automated driving is suspended and operation of the vehicle is handed over to manual driving.

However, when switching over from automated driving to manual driving has taken place, the driver takes over the responsibility for driving operations while grasping the situation around the periphery of the driver's own vehicle (also referred to as a host vehicle). As the time period (duration) during which automated driving is continued becomes longer, it becomes more difficult for the driver to grasp the surrounding situation at the stage at which switching over to manual driving has taken place in the interruption recommendation section, and there is a concern that it may be difficult for the driver to quickly take over the responsibility for driving operations.

The present invention has been devised taking into consideration the aforementioned problem, and has the object of providing a vehicle control device in which driving operations can be performed smoothly and without imparting a sense of discomfort, even when switching over to manual driving from an automated driving state.

[1] A vehicle control device according to the present invention is a vehicle control device configured to perform a travel control for a host vehicle at least partially automatically, including a takeover operation unit configured to execute operations whereby at least a portion of automated driving is handed over to manual driving performed by a driver, and a duration acquisition unit configured to acquire a duration of the automated driving when the at least a portion of the automated driving is handed over to manual driving performed by the driver, wherein, in the case that the duration is greater than or equal to a first predetermined time period, the takeover operation unit performs a takeover operation to hand over driving to manual driving differently from a takeover operation to hand over driving to manual driving in the case that the duration is less than the first predetermined time period.

As used herein, the phrase "at least a portion of automated driving is handed over to manual driving performed by a driver" includes the following cases.

(i) completely automated driving→completely manual driving without travel assistance or manual driving at least a portion of which includes travel assistance; and (ii) partial automated driving in which a travel control is performed partially automatically→completely manual driving without travel assistance or manual driving at least a portion of which includes travel assistance.

Usually, when switching over from automated driving to manual driving, the driver takes over the responsibility for driving operations while grasping the circumstances around the periphery of the host vehicle. As the time period (duration) during which automated driving is continued becomes longer, it becomes more difficult for the driver to grasp the surrounding situation at the stage at which switching over to manual driving has taken place, and thus there is a concern that it may be difficult for the driver to quickly take over the responsibility for driving operations.

When handing over operations to manual driving, if a certain takeover operation is always executed, a time period from when a takeover request is made with respect to the driver until when manual operations are performed stably by the driver fluctuates corresponding to the length or shortness of the duration of automated driving.

Thus, by setting the takeover operation to manual driving in the case that the duration of automated driving is greater than or equal to the first predetermined time period to be different from the takeover operation to manual driving in the case that the duration is less than the first predetermined time period, it is possible to realize an appropriate takeover operation to manual driving corresponding to the duration of automated driving. As a result, the time period from the time at which the takeover request is made with respect to the driver and until manual operations are performed stably by the driver can be made substantially constant, and the commercial value in relation to such automated driving can be enhanced.

[2] In the present invention, if the duration is greater than or equal to the first predetermined time period, compared to the case that the duration is less than the first predetermined time period, the takeover operation unit may hasten a starting time of the takeover operation, or may bring a starting point of the takeover operation closer to the host vehicle.

In the case that the duration of automated driving is long, since there is a possibility of a need to become proficient with manual driving, by hastening the starting time of the takeover operation or by bringing the starting point of the takeover operation closer to the host vehicle, the handover to manual driving can be performed earlier, and therefore, for example, when there is a location where the degree of driving difficulty is high after switching over to manual driving, it is possible to become proficient with manual driving before reaching such a location.

[3] In the present invention, if the duration is greater than or equal to the first predetermined time period, compared to the case that the duration is less than the first predetermined time period, the takeover operation unit may set a necessary time period required for the takeover operation to be longer.

By setting the time required for the takeover operation to be longer, since it is possible to make sufficient time for the driver to perform the takeover operation adequately, it becomes easier for the driver to become proficient during the takeover operation, and the driver can take over the responsibility for manual driving with a high degree of proficiency.

[4] In the present invention, as the degree of difficulty in driving on the travel path after having completed the takeover operation increases, the takeover operation unit may hasten the starting time of the takeover operation, or may bring the starting point of the takeover operation closer to the host vehicle. In accordance with this feature, it is possible to request the handover to manual driving earlier as the degree of driving difficulty becomes higher, and therefore, it is possible to lengthen the learning period or the period to become proficient after having switched over to manual driving.

[5] In the present invention, the takeover operation unit may set the duration to be shorter as the degree of difficulty in driving on the travel path after having completed the takeover operation increases.

In the case that the level of difficulty in driving the host vehicle on a forward travel path is high, it is expected that such a situation will be handled by the driver in an adaptive case-by-case manner. Thus, in the case that the degree of difficulty in driving on the travel route after having completed the takeover operation is high, the duration of automated driving, which is a basis for determining the timing at which the handover to manual driving takes place, is set to be shorter than the actual duration of automated driving.

In accordance with this feature, in the case that the degree of difficulty in driving on the travel route after completion of the takeover operation is high, the probability of transitioning to the takeover operation to manual driving (for example, a takeover operation simultaneously to a steering operation as well as an acceleration/deceleration operation) for cases in which the duration is less than the predetermined time period can be increased.

[6] In the present invention, there may further be provided a state detection unit configured to detect a state of the driver who is occupying a driver's seat, wherein the takeover operation unit may set the starting time or the starting point of the takeover operation on the basis of the state of the driver as detected by the state detection unit. In accordance with this feature, since the starting time or the starting point of the takeover operation can be adjusted depending on the state of the driver who is seated in the driver's seat, it is possible to adjust the period required for the driver to become proficient.

[7] In the present invention, if the duration is greater than or equal to the first predetermined time period, the takeover operation unit may perform the takeover operation in a stepwise manner with respect to the driver.

In the case that the responsibility for manual driving is handed over to the driver, it is conceivable for the driver to take over the steering operation as well as the acceleration/deceleration operation together. However, in the case of handing over operations in this manner, it takes time for a driver, for whom automated driving has gone on for a long duration, to become accustomed to handling both the steering operation as well as the acceleration/deceleration operation. Thus, by performing the takeover operation to manual driving, for a case in which the duration is greater than or equal to the first predetermined time period, in a stepwise manner with respect to the driver, it is possible for the driver to gradually (step-by-step) become proficient with manual driving, and it is possible for the handover of operations to be completed in a shorter time than in the case of handing over both the steering operation and the acceleration/deceleration operation. Moreover, in this instance, proficiency implies becoming accustomed to the operations of one or more objects or tasks, for example, steering and acceleration/deceleration.

[8] In the present invention, the takeover operation unit may hand over a steering operation to the driver before an acceleration/deceleration operation is handed over to the driver.

With manual driving performed by the driver, it takes time to become proficient with the steering operation. Thus, by handing over the steering operation to the driver prior to handing over the acceleration/deceleration operation, handing over of the acceleration/deceleration operation is carried out at a stage at which the driver has become accustomed to a certain extent with the steering operation. As a result, it is possible to shorten the time required for the driver to become accustomed to the manual operations.

[9] In the present invention, when handing over of the steering operation to the driver is performed, in the case that the steering operation is performed by the driver, or in the case that a handover capable state of the steering operation is brought about, before a second predetermined time period has elapsed, the takeover operation unit may transition to handing over of the acceleration/deceleration operation. In accordance with this feature, it is possible for the handover to occur as soon as the driver performs a steering operation during handing over of steering, and it becomes possible for the handover to occur promptly without waiting for the second predetermined time period to elapse.

[10] In the present invention, when handing over of the steering operation to the driver is performed, in the case that the steering operation is not performed by the driver, or in the case that a handover capable state of the steering operation is not brought about, even though the second predetermined time period has elapsed, the takeover operation unit may carry out a control to decelerate the vehicle automatically. In accordance with this feature, by automatically decelerating the vehicle at a point in time when handover of the steering operation has not been completed, it is possible to transition into an appropriate vehicle state.

[11] In the present invention, the takeover operation unit may transition to handing over of the acceleration/deceleration operation, after handing over of the steering operation to the driver is performed, and after the second predetermined time period has elapsed or after the host vehicle has traveled the predetermined distance.

After handover of the steering operation to the driver has been carried out, then by the second predetermined time period having elapsed, or by the host vehicle having traveled the predetermined distance, the driver is able to become accustomed to the steering operation. By handing over the acceleration/deceleration operation at this stage, it becomes possible for the driver to stably perform both the steering operation and the acceleration/deceleration operation.

[12] In the present invention, after handing over of the steering operation to the driver is performed, the takeover operation unit may hand over the acceleration/deceleration operation at a stage at which the driver has performed a manual operation of acceleration/deceleration, prior to elapse of the second predetermined time period, or prior to the host vehicle having traveled the predetermined distance.

After handing over of the steering operation to the driver is performed, manual operation of acceleration/deceleration by the driver prior to elapse of the second predetermined time period, or prior to the host vehicle having traveled the predetermined distance, serves as a necessary condition for the acceleration/deceleration operation of the host vehicle, and therefore, handing over of the acceleration/deceleration operation is brought about even before the second predetermined time period has elapsed, or even before the host vehicle has traveled the predetermined distance.

[13] In the present invention, the takeover operation unit may determine a degree of proficiency of the steering operation that was handed over to the driver, and at a stage at which the driver has become proficient with the steering operation, the takeover operation unit may transition to handing over of the acceleration/deceleration operation.

As the degree of proficiency, the following indexes can be cited.

(a) A duration Tc of the steering operation that was handed over to the driver;

(b) A duration Te for which the steering speed or the steering acceleration in the steering operation lies within a predetermined range.

As the stage at which the driver has become proficient with the steering operation, the following cases can be cited.

(A) The duration Tc a previously set predetermined time period Td;

(B) The duration Te for which the steering speed or the steering acceleration in the steering operation lies within the predetermined range a previously set predetermined time period Tf;

(C) $(Te/Tc) \times 100 \geq 70\%$

"70%" is an appropriate variable value, which can be set with a driving simulator or the like.

In accordance with this feature, handing over of the acceleration/deceleration occurs at a stage at which the driver has become accustomed to the steering operation, and thus it becomes possible for the driver to stably perform both the steering operation and the acceleration/deceleration operation.

[14] In the present invention, the takeover operation unit may transition to handing over of the acceleration/deceleration operation, in the case that a steering speed or a steering acceleration in the steering operation that was handed over to the driver lies within a predetermined range over a predetermined time period.

The case that the steering speed or the steering acceleration in the steering operation that was handed over to the driver lies within the predetermined range over a predetermined time period means a stage at which the driver has become accustomed to the steering operation. Thus, by handing over the acceleration/deceleration operation at this stage, it becomes possible for the driver to stably perform both the steering operation and the acceleration/deceleration operation.

[15] A vehicle control device according to the present invention is a vehicle control device configured to perform a travel control for a host vehicle at least partially automatically, including a takeover operation unit configured to execute operations whereby at least a portion of automated driving is handed over to manual driving performed by the driver, and a continuous travel distance acquisition unit configured to acquire a continuous travel distance of the automated driving when the at least a portion of the automated driving is handed over to manual driving performed by the driver, wherein, in the case that the continuous travel distance is greater than or equal to a first predetermined distance, the takeover operation unit performs a takeover operation to hand over driving to manual driving differently from a takeover operation to hand over driving to manual driving in the case that the continuous travel distance is less than the first predetermined distance.

When switching over from automated driving to manual driving has taken place, the driver takes over the responsibility for driving operations while grasping the situation around the periphery of the host vehicle. As the travel distance (continuous travel distance) during which automated driving is continued becomes longer, it becomes more difficult for the driver to grasp the surrounding situation at the stage at which switching over to manual driving has taken place, and thus there is a concern that it may be difficult for the driver to quickly take over the responsibility for driving operations.

When handing over operations to manual driving, if a certain takeover operation is always executed, a time period from when a takeover request is made with respect to the driver until when manual operations are performed stably by the driver fluctuates corresponding to the length or shortness of the continuous travel distance.

Thus, by setting the takeover operation to manual driving in the case that the continuous travel distance is greater than or equal to the first predetermined distance to be different from the takeover operation to manual driving in the case that the continuous travel distance is less than the first predetermined distance, it is possible to realize an appropriate takeover operation to manual driving corresponding to the continuous travel distance. As a result, the time period from the time at which the takeover request is made with respect to the driver and until manual operations are performed stably by the driver can be made substantially constant, and the commercial value in relation to such automated driving can be enhanced.

[16] A vehicle control device according to the present invention is a vehicle control device configured to perform a travel control for a host vehicle at least partially automatically, including a takeover operation unit configured to execute operations whereby at least a portion of automated driving is handed over to manual driving performed by the driver, and at least one of a duration acquisition unit and a continuous travel distance acquisition unit, the duration acquisition unit being configured to acquire a duration of the automated driving when the at least a portion of the automated driving is handed over to manual driving performed by the driver, the continuous travel distance acquisition unit being configured to acquire a continuous travel distance of the automated driving when the at least a portion of the automated driving is handed over to manual driving performed by the driver, wherein the takeover operation unit hastens the handing over to manual driving as the duration or the continuous travel distance becomes longer.

In the case that the duration of automated driving or the continuous travel distance of automated driving is long, since there is a possibility of a need to become proficient with manual driving, by hastening the handover to manual driving as the duration or the continuous travel distance becomes longer, for example, when there is a location where the degree of driving difficulty is high after switching over to manual driving, it is possible to become proficient with manual driving before reaching such a location.

In accordance with the vehicle control device according to the present invention, driving operations can be performed smoothly and without imparting a sense of discomfort, even when switching over to manual driving from an automated driving state.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 10 is a flowchart (second part thereof) showing a takeover process corresponding to Exemplary Embodiment 2 executed by the takeover operation unit.

DESCRIPTION OF THE PREFERRED EMBODIMENTS

An exemplary embodiment of a vehicle control device according to the present invention will be presented and described in detail below with reference to FIGS. 1 through 10.

Figure 1:
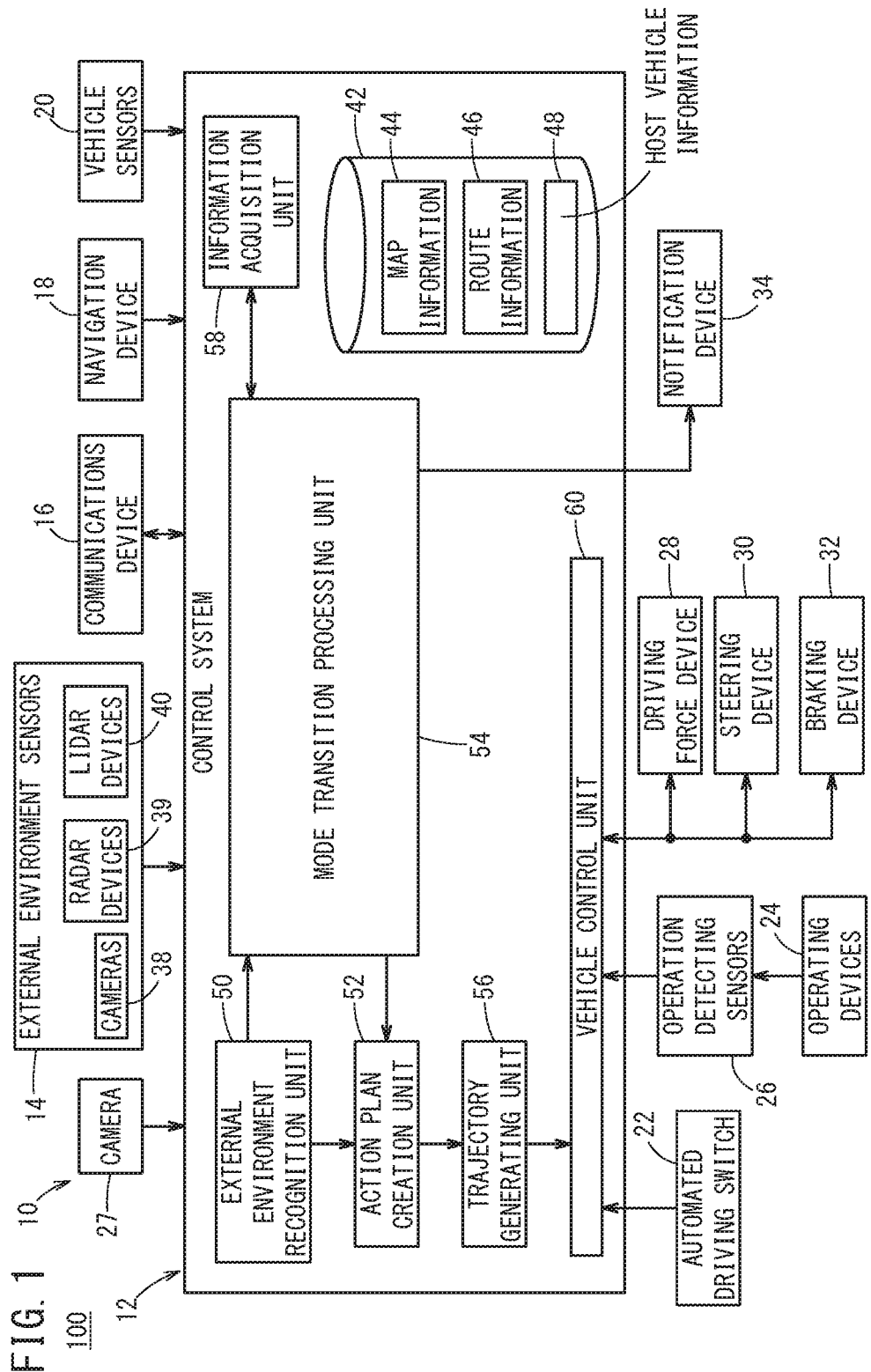
FIG. 1 is a block diagram showing a configuration of a host vehicle including a travel electronic control unit serving as a travel control device according to an embodiment of the present invention.

FIG. 1 is a block diagram showing a configuration of a vehicle control device 10 according to an embodiment of the present invention.

The vehicle control device 10 is incorporated in the driver's own vehicle 100 (hereinafter referred to as a host vehicle 100), and performs a travel control for the vehicle by way of automated driving or manual driving. In this case, the term "automated driving" implies a concept that includes not only "fully automated driving" in which the travel control for the vehicle is performed entirely automatically, but also "partial automated driving" in which the travel control is partially performed automatically.

The vehicle control device 10 is basically made up from an input system device group, a control system 12, and an output system device group. The respective devices of the input system device group and the output system device group are connected via communication lines to the control system 12.

The input system device group includes external environment sensors 14, a communications device 16, a navigation device 18, vehicle sensors 20, an automated driving switch 22, operation detecting sensors 26 connected to operating devices 24, and a vehicle interior camera 27 that detects the state of the driver who is riding in the driver's seat.

The output system device group includes a driving force device 28 for driving the vehicle wheels (not shown), a steering device 30 for steering the vehicle wheels, a braking device 32 for braking the vehicle wheels, and a notification device 34 (notification unit) for notifying the driver primarily through visual and auditory sensation.

The external environment sensors 14 acquire information (hereinafter referred to as external environmental information) indicative of the state of the external environment around the vehicle, and output the acquired external environmental information to the control system 12. More specifically, the external environment sensors 14 are configured to include a plurality of cameras 38, a plurality of radar devices 39, and a plurality of LIDAR devices 40 (Light Detection and Ranging; Laser Imaging Detection and Ranging).

The communications device 16 is configured to be capable of communicating with external devices including roadside devices, other vehicles, and a server, and transmits and receives, for example, information related to transportation facilities, information related to other vehicles, probe information, or latest map information 44. The map information 44 is stored in a predetermined memory area of a storage device 42, or alternatively in the navigation device 18.

The navigation device 18 is constituted to include a satellite positioning device, which is capable of detecting a current position of the vehicle, and a user interface (for example, a touch-panel display, a speaker, and a microphone). Based on the current position of the vehicle or a position designated by the user, the navigation device 18 calculates a route to a designated destination point, and outputs the route to the control system 12. The route calculated by the navigation device 18 is stored as planned travel route information 46 in a predetermined memory area of the storage device 42.

The vehicle sensors 20 output to the control system 12 detection signals from respective sensors, including a vehicle speed sensor for detecting the travel speed V (vehicle velocity), an acceleration sensor for detecting an acceleration, a lateral G sensor (lateral acceleration sensor) for detecting a lateral G force (a lateral acceleration), a yaw rate sensor for detecting an angular velocity about a vertical axis, an orientation sensor for detecting an orientation, and a gradient sensor for detecting a gradient of the vehicle. The detection signals are stored as host vehicle information 48 in a predetermined memory area of the storage device 42.

The automated driving switch 22, for example, is a pushbutton switch provided on the instrument panel. The automated driving switch 22 is configured to be capable of switching between a plurality of driving modes, by manual operation thereof by a user including the driver.

The operating devices 24 include an accelerator pedal, a steering wheel, a brake pedal, a shift lever, and a direction indication (turn signal) lever. The operation detecting sensors 26, which detect the presence or absence or the operated amounts of operations made by the driver, as well as operated positions, are attached to the operating devices 24.

The operation detecting sensors 26 output to a vehicle control unit 60 as detection results an amount by which the accelerator pedal is depressed (degree of accelerator opening), an amount (steering amount) by which the steering wheel is operated, an amount by which the brake pedal is depressed, a shift position, and a right or left turn direction, etc.

The driving force device 28 is constituted from a driving force ECU (Electronic Control Unit), and a drive source including an engine and/or a driving motor. The driving force device 28 generates a travel driving force (torque) for the vehicle in accordance with vehicle control values input thereto from the vehicle control unit 60, and transmits the travel driving force to the vehicle wheels directly or through a transmission.

The steering device 30 is constituted from an EPS (electric power steering system) ECU, and an EPS device. The steering device 30 changes the orientation of the wheels (steered wheels) in accordance with vehicle control values input thereto from the vehicle control unit 60.

The braking device 32, for example, is an electric servo brake used in combination with a hydraulic brake, and is made up from a brake ECU and a brake actuator. The braking device 32 brakes the vehicle wheels in accordance with vehicle control values input thereto from the vehicle control unit 60.

The notification device 34 is made up from a notification ECU, a display device, and an audio device. The notification device 34 performs a notifying operation in relation to automated driving or manual driving (including a takeover request TOR, to be described later), in accordance with a notification command output from the control system 12 (and more specifically, a mode transition processing unit 54 thereof).

In this instance, an "automated driving mode" and a "manual driving mode" (non-automated driving mode) are set so as to be switched sequentially each time that the automated driving switch 22 is pressed. Instead of this feature, in order to provide confirmation of the driver's intention, it is possible to provide settings in which, for example, switching from the manual driving mode to the automated driving mode is effected by pressing twice, and switching from the automated driving mode to the manual driving mode is effected by pressing once.

The automated driving mode is a driving mode in which the vehicle travels under the control of the control system 12 in a state in which the driver does not operate the operating devices 24 (specifically, the accelerator pedal, the steering wheel, and the brake pedal). Stated otherwise, in the automated driving mode, the control system 12 controls a portion or all of the driving force device 28, the steering device 30, and the braking device 32 in accordance with sequentially created action plans.

When the driver performs a predetermined operation using the operating devices 24 during implementation of the automated driving mode, the automated driving mode is canceled automatically, together with switching to a driving mode (which may include the manual driving mode) in which the level of driving automation is relatively low. Hereinafter, an operation in which the driver operates the automated driving switch 22 or any of the operating devices 24 in order to transition from automated driving to manual driving will also be referred to as an "override operation".

The control system 12 is constituted by one or a plurality of ECUs, and comprises various function realizing units in addition to the aforementioned storage device 42. According to the present embodiment, the function realizing units are software-based functional units, in which the functions thereof are realized by a CPU (central processing unit) executing programs stored in the storage device 42. However, the functions thereof can also be realized by hardware-based functional units made up from integrated circuits such as a field-programmable gate array (FPGA) or the like.

In addition to the storage device 42 and the vehicle control unit 60, the control system 12 is configured to include an external environment recognition unit 50, an action plan creation unit 52, a mode transition processing unit 54, a trajectory generating unit 56, and an information acquisition unit 58.

Using various information input thereto from the input system device group (for example, external environmental information from the external environment sensors 14), the external environment recognition unit 50 recognizes lane markings (white lines) on both sides of the vehicle, and generates "static" external environment recognition information, including location information of stop lines and traffic signals, or travel enabled regions in which traveling is possible. Further, using the various information input thereto, the external environment recognition unit 50 generates "dynamic" external environment recognition information, including information concerning obstacles such as parked or stopped vehicles, traffic participants such as people and other vehicles, and the colors of traffic signals.

On the basis of recognition results from the external environment recognition unit 50, the action plan creation unit 52 creates action plans (a time series of events) for each of respective travel segments, and updates the action plans as needed. As types of events, for example, there may be cited events in relation to deceleration, acceleration, branching, merging, lane keeping, lane changing, and passing other vehicles. In this instance, "deceleration" and "acceleration" are events in which the vehicle is made to decelerate or accelerate. "Branching" and "merging" are events in which the vehicle is made to travel smoothly at a branching point or a merging point. "Lane changing" is an event in which the travel lane of the vehicle is made to change. "Passing" is an event in which the vehicle is made to overtake a preceding vehicle.

Further, "lane keeping" is an event in which the vehicle is made to travel without departing from the travel lane, and is subdivided based on a combination of travel modes. More specifically, as such travel modes, there may be included constant speed traveling, follow-on traveling, traveling while decelerating, traveling through a curve, or traveling to avoid obstacles.

Using the map information 44, the planned travel route information 46, and the host vehicle information 48, which are read from the storage device 42, the trajectory generating unit 56 calculates and generates a travel trajectory (a time series of target behaviors) in accordance with the action plan created by the action plan creation unit 52. More specifically, the travel trajectory is a time series data set, in which the data units thereof are defined by a position, a posture angle, a velocity, an acceleration, a curvature, a yaw rate, and a steering angle.

The information acquisition unit 58 acquires information necessary for the process of determining conditions (hereinafter referred to as environmental conditions) in relation to the travel environment of the vehicle. As detailed examples of such necessary information, there may be cited time information (for example, the current time, the time zone, an expected arrival time), geographic information (for example, latitude, longitude, altitude, topography, differences in elevation), and weather information (for example, the weather, temperature, humidity, forecast information).

The vehicle control unit 60 determines respective vehicle control values in order to control traveling of the vehicle, in accordance with the travel trajectory (time series of target behaviors) generated by the trajectory generating unit 56. In addition, the vehicle control unit 60 outputs the obtained vehicle control values, respectively, to the driving force device 28, the steering device 30, and the braking device 32.

Figure 2:
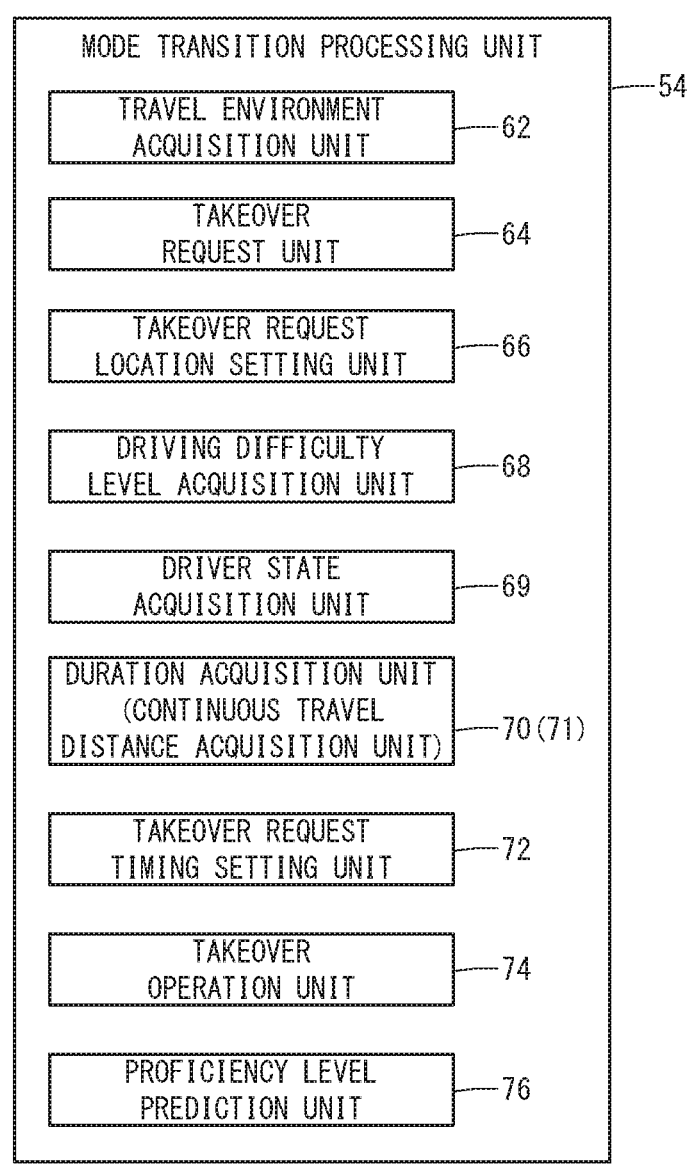
FIG. 2 is a block diagram showing a mode transition processing unit.

On the other hand, the mode transition processing unit 54 performs a process of transitioning between driving modes, and outputs signals to the action plan creation unit 52 and the notification device 34. More specifically, as shown in FIG. 2, the mode transition processing unit 54 functions as a travel environment acquisition unit 62, a takeover request unit 64, a takeover request location setting unit 66, a driving difficulty level acquisition unit 68, a driver state acquisition unit 69, a duration acquisition unit 70 (continuous travel distance acquisition unit 71), a takeover request timing setting unit 72, a takeover operation unit 74, and a proficiency level prediction unit 76. Moreover, concerning the duration acquisition unit 70 (continuous travel distance acquisition unit 71), either one of the duration acquisition unit 70 and the continuous travel distance acquisition unit 71 may be included, or both the duration acquisition unit 70 and the continuous travel distance acquisition unit 71 may be included.

The travel environment acquisition unit 62 acquires information concerning the travel environment of the host vehicle 100. Within the travel environment, there are included the most recent recognition results by the external environment recognition unit 50, or acquired information (for example, the aforementioned time information, geographical information, and weather information) from the information acquisition unit 58.

The takeover request unit 64 performs a request operation to request that the responsibility for manual driving be handed over to (taken over by) the driver. Owing to this feature, responsive to the request operation (notification command) from the takeover request unit 64, the notification device 34 issues, to the driver, a notification to the effect that the driver should take over the responsibility for driving. Hereinafter, the series of operations from the request operation to the notification operation may be referred to as a "TOR" (takeover request).

Figure 3:
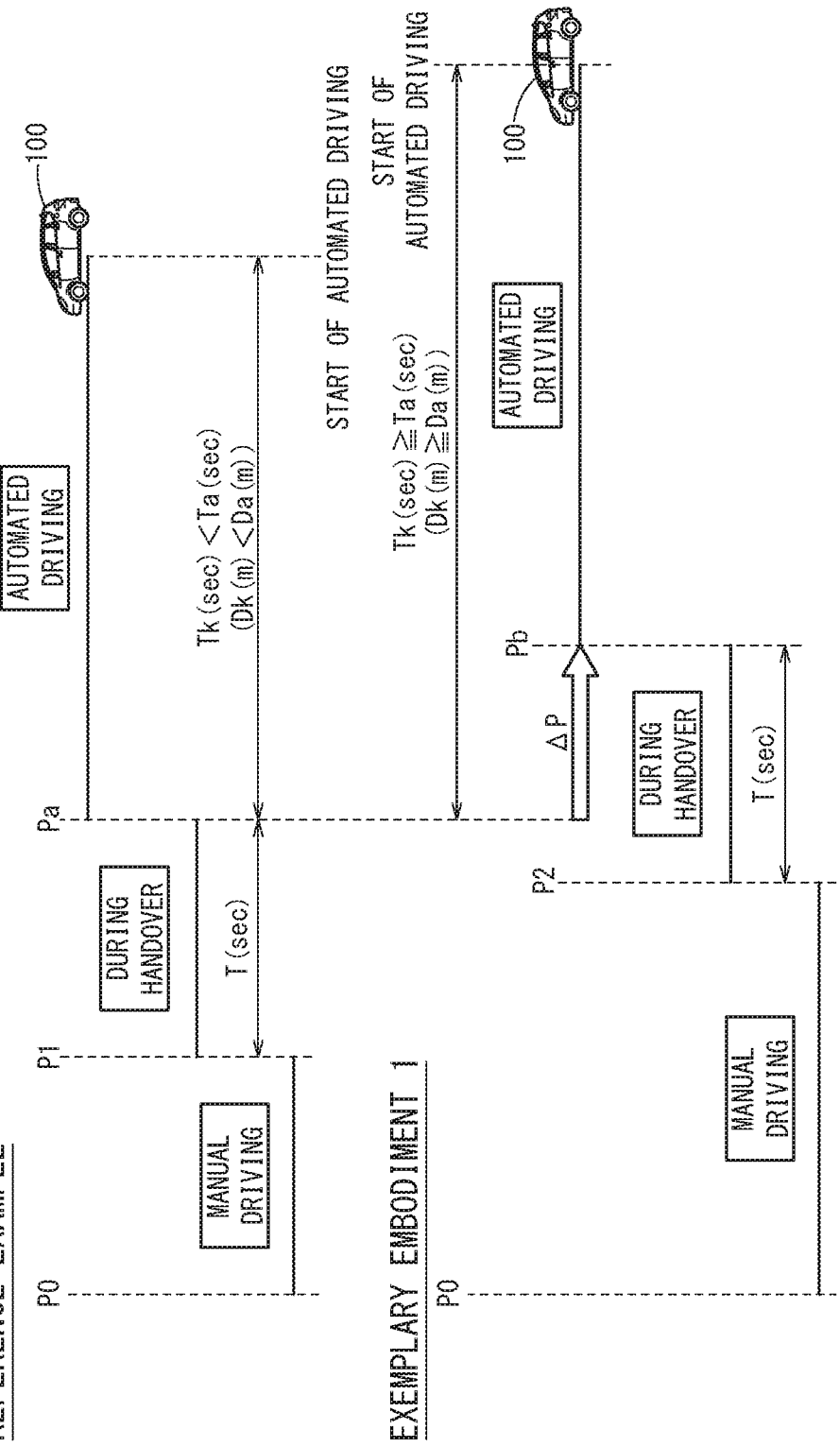
FIG. 3 is a time chart showing travel patterns (Reference Example and Exemplary Embodiment 1) from the time at which the host vehicle has initiated automated driving to the time at which taking over by manual driving occurs.

As shown in the reference example of FIG. 3, during traveling of the host vehicle 100, within the planned travel route of the host vehicle 100 indicated by the planned travel route information 46, the takeover request location setting unit 66 sets a planned TOR starting point Pa at which there is a possibility for a takeover request (TOR: takeover request) to manual driving by the driver to be carried out, and a manual takeover completion point P1 where it is indicated that the handover to manual driving is completed.

The manual takeover completion point P1 is set before a point P0 where the degree of driving difficulty is high. Consequently, it is possible to travel by manual driving for passing through the point P0 where the degree of driving difficulty is high. As examples of points P0 where the degree of driving difficulty is high, there may be cited points where merging, branching, or changing lanes occurs, intersections and points where there is traffic congestion, etc., and expressway toll gates (including ETC (Electronic Toll Collection System) locations).

The planned TOR starting point Pa is set at a certain distance short of the manual takeover completion point P1, the certain distance being calculated in accordance with the expression of vehicle speed (m/sec)×predetermined time (sec)±α (m). The variable α is set appropriately depending on the type of car, the weather, the road surface, and the like.

The driving difficulty level acquisition unit 68 acquires the degree of driving difficulty of travel segments in which the host vehicle 100 travels after the manual takeover completion point P1, during traveling of the host vehicle 100. The degree of driving difficulty is evaluated on the basis of an index value determined from the surrounding environment (backlight, fog, rain, nighttime, etc.), the situation of surrounding vehicles (congestion, speed of other vehicles, etc.), the road environment (curves, inclination, outlook, etc.), and the like at the time of manual driving.

The driver state acquisition unit 69 monitors the state of the driver, and based on image data of the driver from the vehicle interior camera 27, as well as detection signals from various sensors such as when the driver is grasping the steering wheel or the like, numerically determines whether a state exists in which it is possible to transition quickly to handing over the responsibility for manual driving to the driver, by indexing such a state. For example, a case in which the driver is monitoring the surrounding environment, a case in which the driver is dozing, a case in which the driver is operating a mobile information terminal, a case in which the driver is reading, and the like, are indexed, and the numerical determination is made based on the indexing.

The duration acquisition unit 70 acquires a duration Tk of automated driving when a takeover operation is performed to hand over at least a portion of such automated driving to manual driving performed by the driver. More specifically, prior to handing over the at least a portion of automated driving to manual driving performed by the driver, the duration Tk of automated driving at the point in time that the handover to manual driving is to occur is acquired.

For example, as shown in the reference example of FIG. 3, in the case that the host vehicle 100 is traveling by automated driving toward the planned TOR starting point Pa, and assuming that automated driving is executed without change until the host vehicle 100 arrives at the planned TOR starting point Pa, the duration acquisition unit 70 predicts the duration Tk of automated driving up to that point.

The takeover request timing setting unit 72 calculates a TOR advancement amount ΔP (time or distance) of the planned TOR starting point Pa in accordance with the duration Tk of automated driving, the level of driving difficulty in the upcoming manual driving segment, the state of the driver during automated driving, and the like, and acquires a corrected planned TOR starting point Pb by correcting the planned TOR starting point Pa by the TOR advancement amount ΔP.

In the case that only the duration acquisition unit 70 is included therein, the takeover operation unit 74 performs the takeover operation to manual driving in accordance with the duration Tk of automated driving. Stated otherwise, the takeover operation unit 74 performs the takeover operation to manual driving depending on the duration Tk.

In the reference example of FIG. 3, a planned takeover time period T (sec) is acquired, and the driver is assisted so that the handover to manual driving is completed within the planned takeover time period T. For example, a takeover request TOR (a display, a voice output, or the like) is carried out to prompt the driver to undertake manual driving. Thereafter, on the basis of an override operation made by the driver, automated driving in relation to steering and acceleration/deceleration, etc., is canceled.

Several exemplary embodiments of the vehicle control device will now be described while referring to FIGS. 3 through 6. For purposes of comparison, the reference example is also shown in FIGS. 3 through 6.

Exemplary Embodiment 1

As shown in FIG. 3, in the case that the predicted duration Tk is greater than or equal to the previously set first predetermined time period Ta, the takeover request timing setting unit 72 of the vehicle control device according to Exemplary Embodiment 1 corrects the planned TOR starting point Pa. More specifically, the location of the planned TOR starting point is set to a point Pb in advance of the previously set point Pa as viewed from the perspective of the host vehicle 100. In the description below, the corrected point Pb will be referred to as a planned TOR starting point Pb. In this manner, by advancing the TOR ahead in time, the point where the handover to manual driving is completed, that is, a point P2 in advance of the previously set point P1 as viewed from the perspective of the host vehicle 100 becomes the manual takeover completion point P2.

More specifically, as shown in FIG. 3, the takeover request timing setting unit 72 sets the planned TOR starting point Pb in advance by a fixed time period (for example, 30 seconds to three minutes) from the set planned TOR starting point Pa, in a travel segment where the host vehicle 100 is positioned. Alternatively, the planned TOR starting point Pb is set in a travel segment located a fixed distance (for example, 500 m to 3 km) in advance of the planned TOR starting point Pa.

Concerning the advancement amount ΔP (time or distance) from the planned TOR starting point Pa to the planned TOR starting point Pb, a maximum amount may be set beforehand, so that no advancement amount ΔP is set beyond such a maximum amount. The maximum amount may be a fixed value, or may be variable depending on the vehicle speed, the type of vehicle, and the like. The same feature also applies to the second and subsequent exemplary embodiments to be described later.

On the other hand, the takeover operation unit 74 acquires the planned takeover time period T (sec) at the stage at which the host vehicle 100 has arrived at the planned TOR starting point Pb, and assists the driver so as to complete the handover to manual driving (steering operation, acceleration/deceleration operation, etc.) within the planned takeover time period T.

Exemplary Embodiment 2

Figure 4:
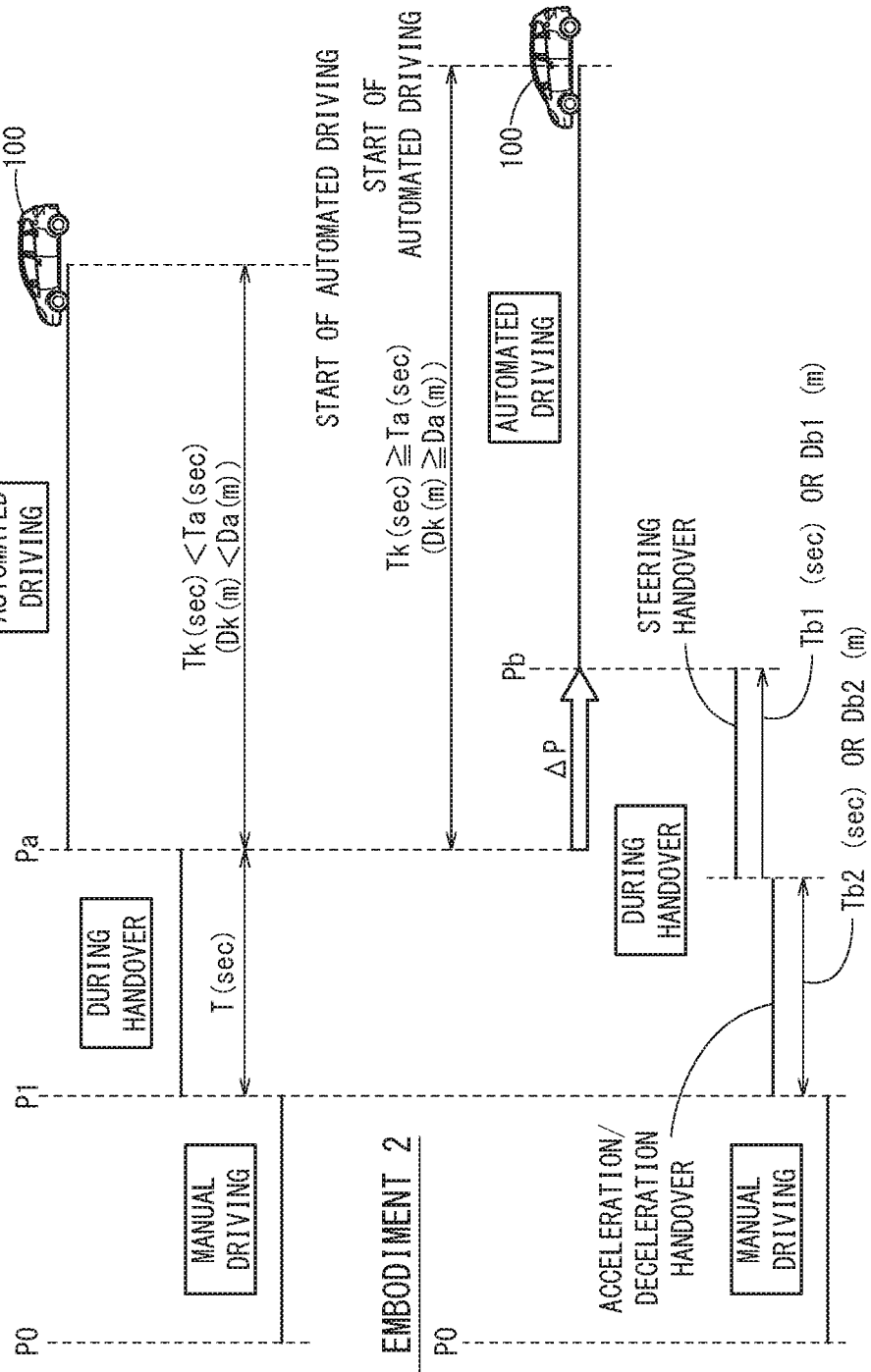
FIG. 4 is a time chart showing travel patterns (Reference Example and Exemplary Embodiment 2) from the time at which the host vehicle has initiated automated driving to the time at which taking over by manual driving occurs.

As shown in FIG. 4, in the case that the predicted duration Tk is greater than or equal to the previously set first predetermined time period Ta, similar to the aforementioned Exemplary Embodiment 1, the takeover request timing setting unit 72 of the vehicle control device according to Exemplary Embodiment 2 sets the planned TOR starting point Pb in advance by a fixed time period Tz (for example, 30 seconds to 3 minutes) from the set planned TOR starting point Pa, in a travel segment where the host vehicle 100 is located. Alternatively, the planned TOR starting point Pb is set in a travel segment located a fixed distance Dz (for example, 500 m to 3 km) in advance of the planned TOR starting point Pa.

On the other hand, in the case that the duration Tk is greater than or equal to the first predetermined time period Ta, or alternatively, in the case that the level of driving difficulty in the travel segment after the manual takeover completion point P1 is high, or alternatively, in the case it is determined that handing over to manual driving is difficult based on the state of the driver during automated driving, the takeover operation unit 74 performs the takeover operation in a stepwise manner with respect to the driver from the planned TOR starting point Pb. For example, a control is performed so as to hand over the steering operation to the driver before handing the acceleration/deceleration operation over to the driver.

More specifically, the takeover operation unit 74 acquires a planned steering takeover time period Tb1 (sec) or a planned steering takeover distance Db1 (m) at the stage at which the host vehicle 100 has arrived at the planned TOR starting point Pb, and assists the driver so as to complete the handover of the steering operation within the planned steering takeover time period Tb1 or the planned steering takeover distance Db1. In the handover of the steering operation, for example, a takeover request TOR (a display, a voice output, or the like) is carried out to prompt the driver to assume responsibility for the steering operation. Thereafter, on the basis of an override operation made by the driver, automated driving in relation to steering is canceled.

Further, the takeover operation unit 74 acquires a planned acceleration/deceleration takeover time period Tb2 (sec) or a planned acceleration/deceleration takeover distance Db2 (m) at a stage in which the handover of the steering operation has been completed, and assists the driver so as to complete the handover of the acceleration/deceleration operation within the planned acceleration/deceleration takeover time period Tb2 or the planned acceleration/deceleration takeover distance Db2. In the handover of the acceleration/deceleration operation, for example, a takeover request TOR (a display, a voice output, or the like) is carried out to prompt the driver to assume responsibility for the acceleration/deceleration operation. Thereafter, on the basis of an override operation made by the driver, automated driving in relation to acceleration/deceleration is canceled.

Further, even if the duration Tk is less than the first predetermined time period Ta, in the case that the level of driving difficulty in the travel segment after the manual takeover completion point P1 is high, or alternatively, in the case it is determined that handing over to manual driving is difficult based on the state of the driver during automated driving, the takeover operation unit 74 performs the takeover operation in the aforementioned stepwise manner with respect to the driver from the planned TOR starting point Pa before correction thereof.

Modification 1 of Exemplary Embodiment 2

The takeover operation unit 74 may determine a degree of proficiency of the steering operation that was handed over to the driver, and at a stage at which the driver has become proficient with the steering operation, the takeover operation unit 74 may transition to handing over of the acceleration/deceleration operation.

In this instance, as the degree of proficiency, the following indexes can be cited.

(a) A duration Tc of the steering operation that was handed over to the driver;

(b) A duration Te for which the steering speed or the steering acceleration in the steering operation lies within a predetermined range.

As the stage at which the driver has become proficient with the steering operation, the following cases can be cited.

(A) The duration Tc a previously set predetermined time period Td;

(B) The duration Te for which the steering speed or the steering acceleration in the steering operation lies within the predetermined range≥a previously set predetermined time period Tf;

(C) (Te/Tc)×100≥70%

"70%" is an appropriate variable value, which can be set with a driving simulator or the like.

Modification 2 of Exemplary Embodiment 2

After handing over of the steering operation to the driver is performed, the takeover operation unit 74 may hand over the acceleration/deceleration operation to the driver, at a stage at which the driver has performed a manual operation of acceleration/deceleration, prior to elapse of the planned acceleration/deceleration takeover time period Tb2, or prior to the host vehicle 100 having traveled the planned acceleration/deceleration takeover distance Db2.

Modification 3 of Exemplary Embodiment 2

When handing over of the steering operation to the driver is performed, the takeover operation unit 74 may hand over the acceleration/deceleration operation to the driver, in the case that the steering operation is performed by the driver, or in the case that a handover capable state of the steering operation is brought about, prior to elapse of the planned steering takeover time period Tb1, or prior to the host vehicle 100 having traveled the planned steering takeover distance Db1.

Modification 4 of Exemplary Embodiment 2

When handing over of the steering operation to the driver is performed, the takeover operation unit 74 may carry out a control to decelerate the host vehicle automatically, in the case that the steering operation is not performed by the driver, or in the case that a handover capable state of the steering operation is not brought about, even though the planned steering takeover time period Tb1 has elapsed, or even though the host vehicle has traveled the planned steering takeover distance Db1.

Exemplary Embodiment 3

Figure 5:
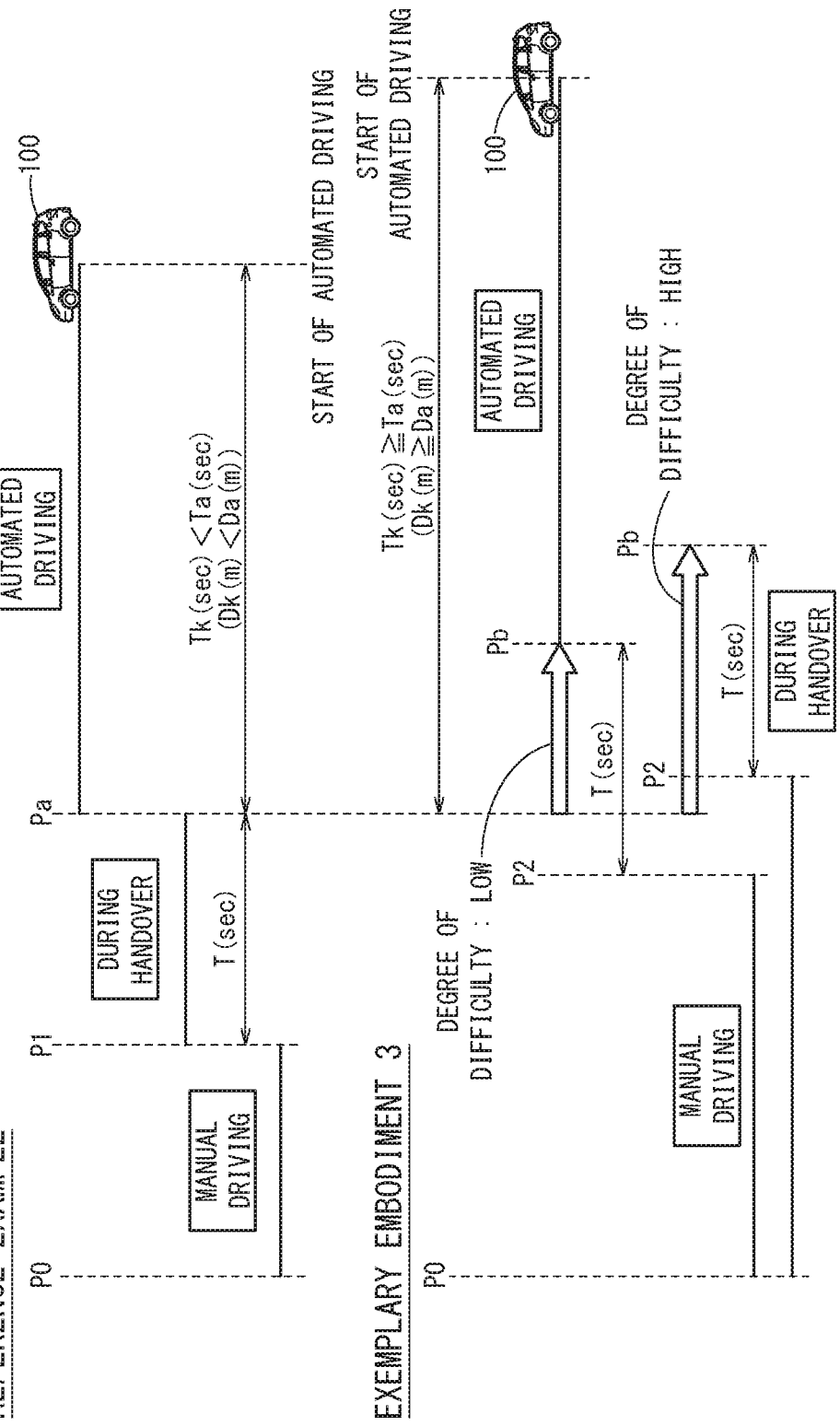
FIG. 5 is a time chart showing travel patterns (Reference Example and Exemplary Embodiment 3) from the time at which the host vehicle has initiated automated driving to the time at which taking over by manual driving occurs.

As shown in FIG. 5, in the case that the predicted duration Tk is greater than or equal to the previously set first predetermined time period Ta, the takeover request timing setting unit 72 of the vehicle control device according to Exemplary Embodiment 3 sets the planned TOR starting point Pb according to the level (high or low) of the degree of driving difficulty of the travel segment after the manual takeover completion point P1.

For example, if the degree of driving difficulty is low, the advancement amount (time or distance) from the planned TOR starting point Pa to the planned TOR starting point Pb is shortened. If the degree of driving difficulty is high, the aforementioned advancement amount (time or distance) is lengthened.

On the other hand, similar to the above-described first exemplary embodiment, the takeover operation unit 74 performs a control so as to hand over manual driving (steering operation, acceleration/deceleration operation, etc.) to the driver at the stage at which the host vehicle has arrived at the planned TOR starting point Pb.

Exemplary Embodiment 4

Figure 6:
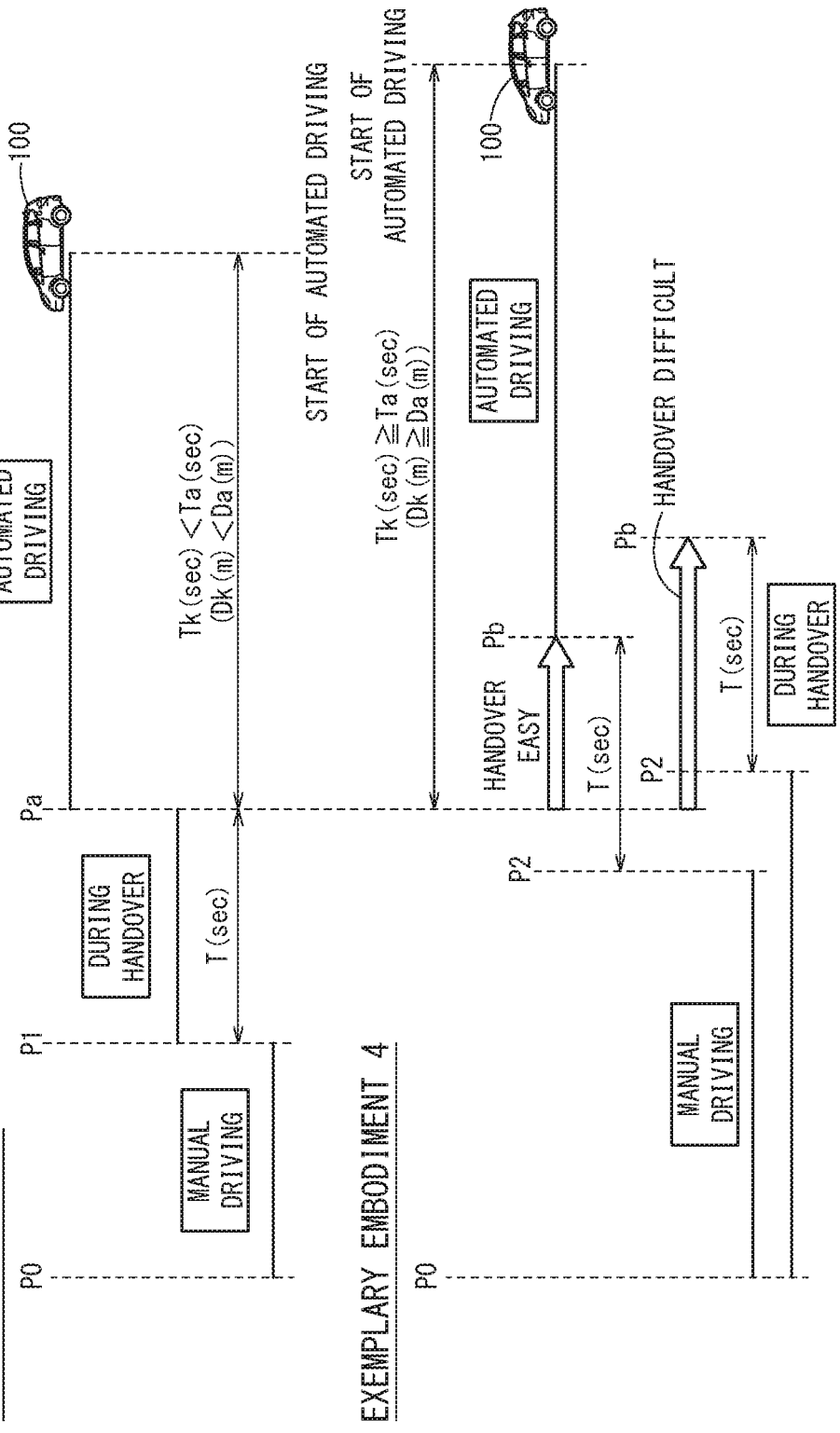
FIG. 6 is a time chart showing travel patterns (Reference Example and Exemplary Embodiment 4) from the time at which the host vehicle has initiated automated driving to the time at which taking over by manual driving occurs.

As shown in FIG. 6, in the case that the predicted duration Tk is greater than or equal to the previously set first predetermined time period Ta, the takeover request timing setting unit 72 of the vehicle control device according to Exemplary Embodiment 4 sets the planned TOR starting point Pb according to the state (numerical value) of the driver during automated driving, which is acquired by the driver state acquisition unit 69.

In addition, in the case it is determined based on the state of the driver during automated driving that handover to manual driving will be easy, the takeover request timing setting unit 72 shortens the advancement amount (time or distance) from the planned TOR starting point Pa to the planned TOR starting point Pb. Conversely, in the case it is determined on the basis of the state of the driver during automated driving that the handover to manual driving will be difficult, the advancement amount ΔP (time or distance) is lengthened.

On the other hand, similar to the above-described first exemplary embodiment, the takeover operation unit 74 performs a control so as to hand over manual driving (steering operation, acceleration/deceleration operation, etc.) to the driver at the stage at which the host vehicle has arrived at the planned TOR starting point Pb.

In the above-described first through fourth exemplary embodiments, the planned TOR starting point Pb is corrected toward the front by determining whether or not the duration Tk of automated driving is greater than or equal to the first predetermined time period Ta. However, the planned TOR starting point Pb may also be corrected toward the front in the case that a continuous travel distance Dk over which automated driving takes place is longer than a first predetermined distance Da.

Further, the takeover operation to manual driving is changed depending on whether the duration Tk or the continuous travel distance Dk over which automated driving takes place has exceeded a threshold value (the first predetermined time Ta or the first predetermined distance Da). However, the handover to manual driving may be set so as to be hastened or occur earlier in terms of time or distance as the duration Tk or the continuous travel distance Dk becomes longer.

Next, an example of processing operations of the vehicle control device 10 according to the present embodiment, and in particular, the processing operations of the vehicle control device according to the above-described first, third and fourth exemplary embodiments, will be described with reference to FIGS. 7 and 8.

First, in step S1, the mode transition processing unit 54 determines whether or not the automated driving mode is turned "ON". If the automated driving mode is not on, or in other words, if manual driving is being performed (step S1: NO), the process proceeds to step S2, and the vehicle control device 10 continues with manual driving of the host vehicle 100, and then returns to step S1 after a certain period of time has elapsed. On the other hand, in the case it is determined that the automated driving mode is in effect, or in other words, if the host vehicle 100 is traveling on the basis of an action plan (step S1: YES), the process proceeds to step S3.

In step S3, the takeover request location setting unit 66 acquires the planned travel route information 46 during traveling of the host vehicle 100.

In step S4, the takeover request location setting unit 66 acquires the manual takeover completion point P1, which indicates completion of the handover to manual driving, from within the planned travel route of the host vehicle 100 as indicated by the planned travel route information 46 that was acquired.

In step S5, the takeover request location setting unit 66 acquires the planned TOR starting point Pa at which there is a possibility for a takeover request (TOR: takeover request) to manual driving by the driver to be carried out, from within the planned travel route of the host vehicle 100 as indicated by the planned travel route information 46 that was acquired.

In step S6, the driving difficulty level acquisition unit 68 acquires the degree of driving difficulty of a travel segment (a segment where manual driving will take place in the future) in which the host vehicle 100 will travel after the manual takeover completion point P1.

In step S7, the driver state acquisition unit 69 obtains the state of the driver during automated driving at the present time.

In step S8, the takeover request timing setting unit 72 calculates the TOR advancement amount ΔP (time or distance) of the planned TOR starting point Pa, in accordance with the duration Tk of automated driving, the level of driving difficulty in the segment where manual driving will take place in the future, and the state of the driver during automated driving, etc. In this case, instead of the duration Tk of automated driving, the continuous travel distance Dk over which automated driving occurs may also be used.

In step S9, the takeover request timing setting unit 72 corrects the planned TOR starting point Pa by the TOR advancement amount ΔP, and thereby acquires the planned TOR starting point Pb.

In step S10, the takeover operation unit 74 determines whether or not the host vehicle 100 has reached the planned TOR starting point Pb as corrected. If the planned TOR starting point Pb has not been reached (step S10: NO), the process returns to step S6, and step S6 and the steps subsequent thereto are repeated. This is because the level of driving difficulty in the travel segment in which the host vehicle 100 will travel after the manual takeover completion point P1, as well as the state of the driver during automated driving at the present time change moment by moment, and therefore, it is necessary for the TOR advancement amount ΔP to be recalculated.

If it is determined in the above-described step S10 that the host vehicle 100 has reached the planned TOR starting point Pb as corrected, the process proceeds to step S11, and the takeover process is entered into by the takeover operation unit 74.

Figure 8:
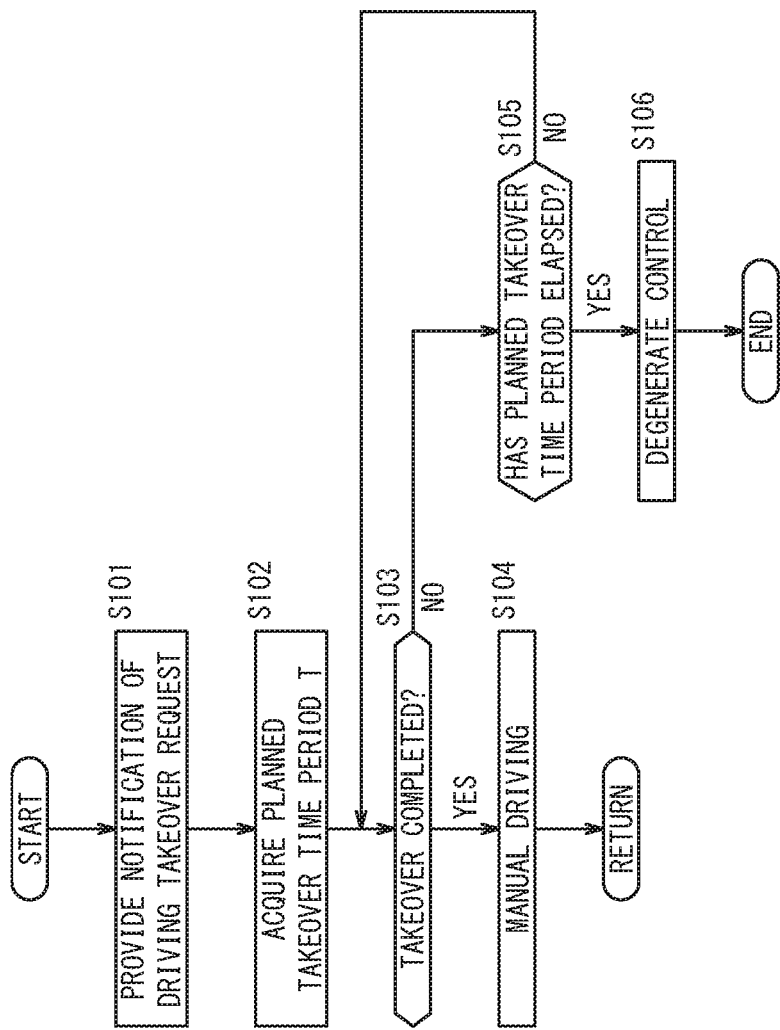
FIG. 8 is a flowchart showing a takeover process corresponding to Exemplary Embodiment 1, Exemplary Embodiment 3, and Exemplary Embodiment 4 executed by a takeover operation unit.

More specifically, in step S101 of FIG. 8, the takeover operation unit 74 issues a notification to the driver (by way of sound, display, vibration, etc.), for example, concerning the driving takeover request.

Thereafter, in step S102, the takeover operation unit 74 acquires the planned takeover time period T (sec) and initiates timekeeping.

Thereafter, in step S103, the takeover operation unit 74 monitors whether or not taking over of manual driving by the driver has been completed, and operations of the steering wheel or operations of the accelerator pedal, as well as the state of the driver are detected (the state of the driver is confirmed with a camera provided in the vehicle compartment).

In the case it is detected in step S103 that the driver has executed manual driving or is in a state capable of executing manual driving (step S103: YES), then in step S104, the automated driving mode is terminated and handing over to manual driving is implemented. Thereafter, following the elapse of a predetermined time period, the process returns to step S1 of FIG. 7.

On the other hand, if it is determined in step S103 that the handover to manual driving has not been completed (step S103: NO), the process proceeds to step S105, and it is determined whether or not the planned takeover time period T has elapsed. If the planned takeover time period T has not elapsed (step S105: NO), the process returns to step S103, and step S103 and the steps subsequent thereto are repeated.

In the case that the driver has not taken over the responsibility for manual driving even though the planned takeover time period T has elapsed in the aforementioned step S105 (step S105: YES), the process proceeds to step S106 and a degenerate control is executed. In the degenerate control, the hazard lamp is turned on and the vehicle is stopped or a stopped state of the vehicle is maintained by automatic braking. Further, when the vehicle is stopped, at least one of the actions of causing the vehicle to approach the road shoulder by a steering control, or making a lane change from the passing lane to the travel lane of an expressway is performed.

Next, an example of processing operations of the vehicle control device 10 according to the present embodiment, and in particular, processing operations of the vehicle control device according to the above-described Exemplary Embodiment 2, will be described with reference to FIGS. 7, 9, and 10.

Figure 7:
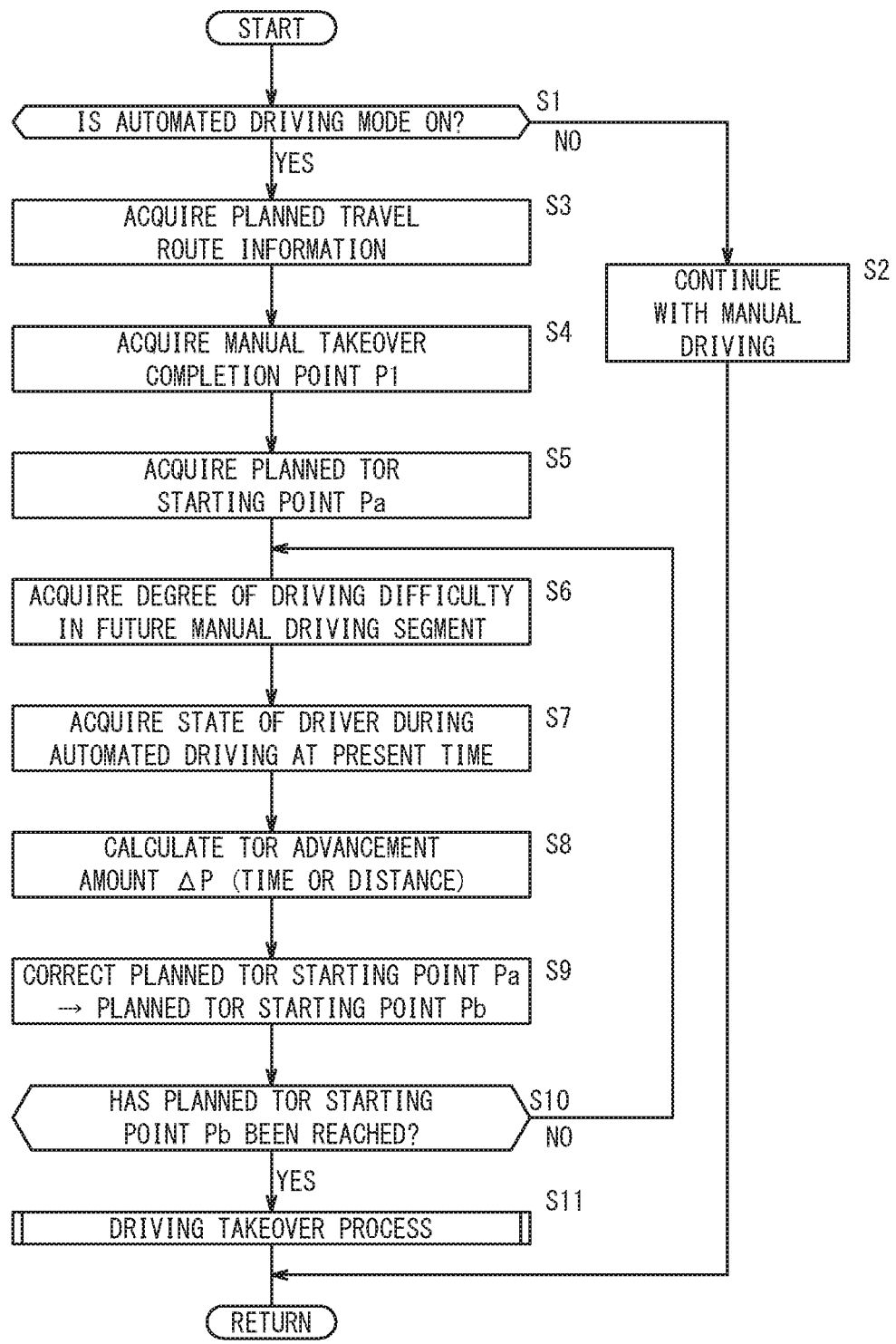
FIG. 7 is a flowchart showing processing operations of the vehicle control device according to the present embodiment.

The processing operations of Exemplary Embodiment 2 differ from those of the takeover process performed by the takeover operation unit 74 in relation to step S11 from among steps S1 to S11 of FIG. 7. Therefore, a description will be given of only the takeover process performed by the takeover operation unit 74.

Figure 9:
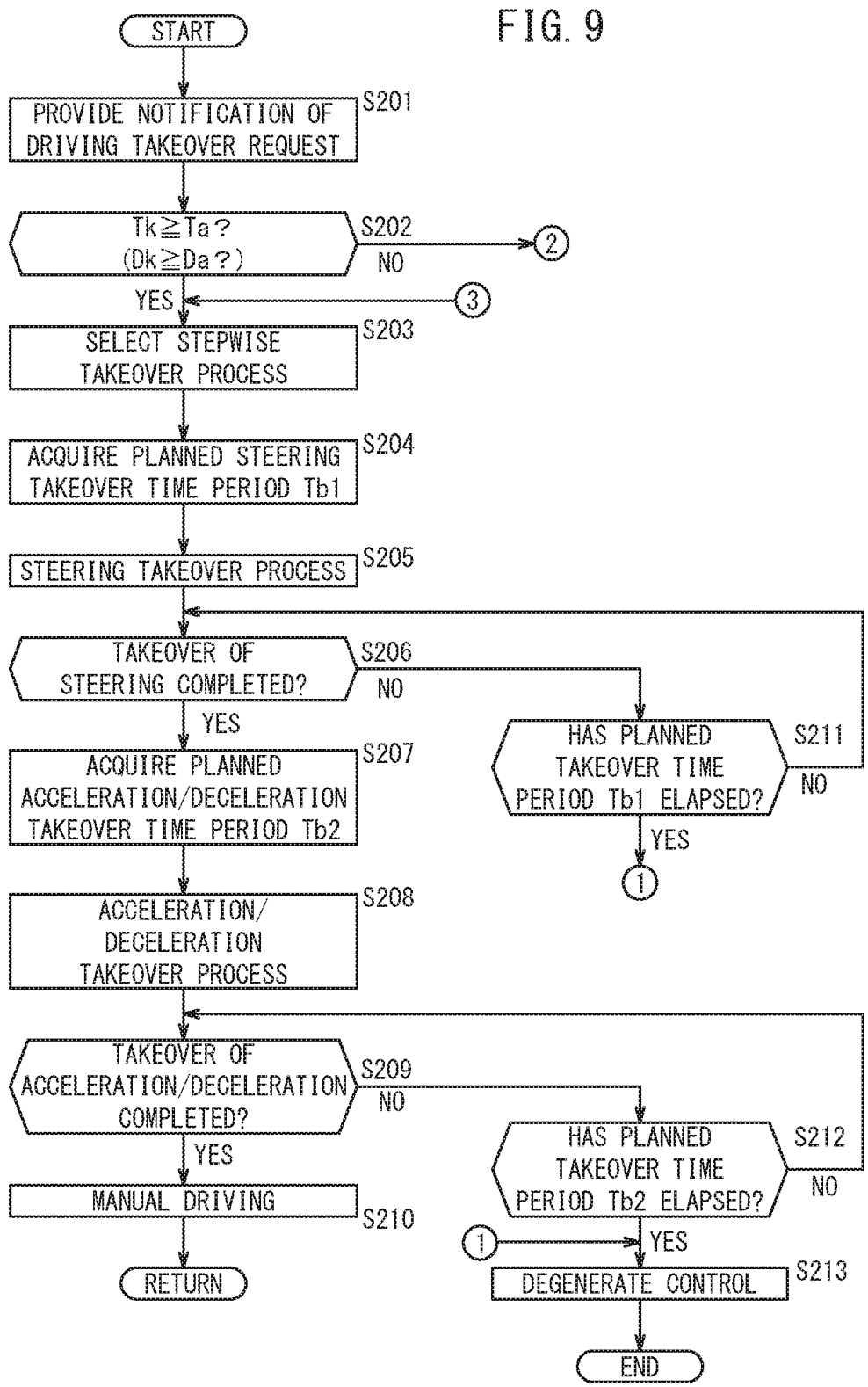
FIG. 9 is a flowchart (first part thereof) showing a takeover process corresponding to Exemplary Embodiment 2 executed by the takeover operation unit.

More specifically, in step S201 of FIG. 9, the takeover operation unit 74 issues a notification to the driver (by way of sound, display, vibration, etc.), for example, concerning the driving takeover request.

Thereafter, in step S202, the takeover operation unit 74 determines whether or not the duration Tk of automated driving is greater than or equal to the first predetermined time period Ta.

If the duration Tk is greater than or equal to the first predetermined time period Ta, the process proceeds to step S203, and the takeover operation unit 74 selects a stepwise takeover process. Selection of the stepwise takeover process by the takeover operation unit 74 is also performed in the case that the level of driving difficulty in the travel segment after the manual takeover completion point P1 is high, or alternatively, in the case it is determined that handing over to manual driving is difficult based on the state of the driver during automated driving. This feature will be described later. Moreover, in step S202, instead of determining whether the duration Tk of automated driving is greater than or equal to the first predetermined time period Ta, a determination may be made as to whether or not the continuous travel distance Dk over which automated driving occurs is greater than or equal to the first predetermined distance Da.

Thereafter, in step S204, the takeover operation unit 74 acquires the planned steering takeover time period Tb1 and initiates timekeeping.

In step S205, the takeover operation unit 74 performs the steering takeover process. In the steering takeover process, processing is carried out based on the above-described Exemplary Embodiment 2 and Modifications 1 to 4 thereof.

Thereafter, in step S206, the takeover operation unit 74 monitors whether or not taking over of the steering operation by the driver has been completed, and furthermore, the state of the driver is detected (the state of the driver is confirmed with a camera provided in the vehicle compartment).

In the case it is detected that the driver has taken over the responsibility for steering or is in a state capable of executing steering (step S206: YES), the process proceeds to step S207, whereupon the takeover operation unit 74 acquires the planned acceleration/deceleration takeover time period Tb2 and initiates timekeeping.

In step S208, the takeover operation unit 74 performs the acceleration/deceleration takeover process. In the acceleration/deceleration takeover process as well, processing is carried out based on the above-described Exemplary Embodiment 2 and Modifications 1 to 4 thereof.

Thereafter, in step S209, the takeover operation unit 74 monitors whether or not taking over of the acceleration/deceleration operation by the driver has been completed, and furthermore, the state of the driver is detected (the state of the driver is confirmed with a camera provided in the vehicle compartment).

In the case it is detected in step S209 that the driver has taken over acceleration/deceleration or is in a state capable of taking over execution thereof (step S209: YES), the process proceeds to step S210, the automated driving mode is terminated, and handing over to manual driving is implemented. Thereafter, following the elapse of a predetermined time period, the process returns to step S1 of FIG. 7.

On the other hand, if it is determined in step S206 that the handover of the steering operation has not been completed (step S206: NO), the process proceeds to step S211, and it is determined whether or not the planned steering takeover time period Tb1 has elapsed. If the time period Tb1 has not elapsed (step S211: NO), the process returns to step S206, and step S206 and the steps subsequent thereto are repeated.

In the case that the driver has not taken over the responsibility for the steering operation even though the planned steering takeover time period Tb1 has elapsed in the aforementioned step S211 (step S211: YES), the process proceeds to step S213 and a degenerate control is executed.

Similarly, if it is determined in step S209 that the handover of the acceleration/deceleration operation has not been completed (step S209: NO), the process proceeds to step S212, and it is determined whether or not the planned acceleration/deceleration takeover time period Tb2 has elapsed. If the time period Tb2 has not elapsed (step S212: NO), the process returns to step S209, and step S209 and the steps subsequent thereto are repeated.

In the case that the driver has not taken over the responsibility for the acceleration/deceleration operation even though the planned acceleration/deceleration takeover time period Tb2 has elapsed in the aforementioned step S212 (step S212: YES), the process proceeds to step S213 and a degenerate control is executed.

Moreover, in addition to the case in which the duration Tk of automated driving is greater than or equal to the first predetermined time period Ta, or the case in which the continuous travel distance Dk over which automated driving takes place is greater than or equal to the first predetermined distance Da, the stepwise takeover process of the aforementioned step S203 is also carried out in the case that the level of driving difficulty in the travel segment after the manual takeover completion point P1 is high, or alternatively, in the case it is determined that handing over to manual driving is difficult based on the state of the driver during automated driving.

Accordingly, if it is determined in step S202 that the duration Tk of automated driving is less than the first predetermined time period Ta or that the continuous travel distance Dk over which automated driving takes place is less than the first predetermined distance Da (step S202: NO), then the process proceeds to step S214 in FIG. 10, whereupon the takeover operation unit 74 determines whether or not the level of driving difficulty in the travel segment after the manual takeover completion point P1 is high.

If the level of driving difficulty is high (step S214: YES), the process proceeds to the stepwise takeover process of step S203 and the steps subsequent thereto of FIG. 9. If the level of driving difficulty is low (step S214: NO), the process proceeds to step S215 of FIG. 10, whereupon the takeover operation unit 74 determines whether or not it will be difficult, based on the state of the driver during automated driving, for operations to be taken over by the driver.

If handing over of operations is difficult (step S215: YES), the process proceeds to the stepwise takeover process of step S203 and the steps subsequent thereto of FIG. 9. If handing over of operations is not difficult (step S215: NO), the process proceeds to step S216 of FIG. 10, and the takeover process in accordance with the first, third, and fourth exemplary embodiments (see FIG. 8) is entered into.

In the foregoing manner, the vehicle control device 10 according to the present embodiment is a vehicle control device 10 adapted to perform a travel control for the host vehicle 100 at least partially automatically, and includes the takeover operation unit 74 that executes operations in which at least a portion of automated driving is handed over to manual driving performed by the driver, and the duration acquisition unit 70 that acquires a duration Tk of the automated driving when the at least a portion of the automated driving is handed over to manual driving performed by the driver. In the case that the duration Tk is greater than or equal to a predetermined time period (first predetermined time period Ta), the takeover operation unit 74 performs the operation to hand over driving to manual driving differently from the operation to hand over driving to manual driving in the case that the duration Tk is less than the first predetermined time period Ta.

When switching over from automated driving to manual driving has taken place, the driver takes over the responsibility for driving operations while grasping the situation around the periphery of the host vehicle 100. As the time period (duration Tk) during which automated driving is continued becomes longer, it becomes more difficult for the driver to grasp the surrounding situation at the stage at which switching over to manual driving has taken place, and thus there is a concern that it may be difficult for the driver to quickly take over the responsibility for driving operations.

When handing over operations to manual driving, if a certain takeover operation is always executed, a time period from when a takeover request is made with respect to the driver until when manual operations are performed stably by the driver fluctuates corresponding to the length or shortness of the duration Tk.

Thus, by setting the takeover operation to manual driving in the case that the duration Tk of automated driving is greater than or equal to the first predetermined time period Ta to be different from the takeover operation to manual driving in the case that the duration Tk is less than the first predetermined time period Ta, it is possible to realize an appropriate takeover operation to manual driving corresponding to the duration Tk of automated driving. As a result, the time period from the time at which the takeover request is made with respect to the driver until the time at which manual operations are performed stably by the driver can be made substantially constant, and the commercial value in relation to such automated driving can be enhanced.

In the present embodiment, if the duration Tk is greater than or equal to the first predetermined time period Ta, compared to the case in which the duration Tk is less than the first predetermined time period Ta, the takeover operation unit 74 hastens the starting time of the takeover operation, or brings the starting point of the takeover operation closer to the host vehicle (i.e., shortens the distance from the host vehicle to the starting point).

In the case that the duration Tk of automated driving is long, since there is a possibility of a need to become proficient with manual driving, by hastening the starting time of the takeover operation or by bringing the starting point of the takeover operation closer to the host vehicle, the handover to manual driving can be performed earlier. Therefore, for example, when there is a location where the degree of driving difficulty is high after switching over to manual driving, it is possible to become proficient with manual driving before reaching such a location.

In the present embodiment, if the duration Tk is greater than or equal to the first predetermined time period Ta, compared to the case in which the duration Tk is less than the first predetermined time period Ta, the takeover operation unit 74 sets a necessary time period required for the takeover operation to be longer.

By setting the time required for the TOR to be longer, since it is possible to make sufficient time for the driver to perform the takeover operation accurately, it becomes easier for the driver to become proficient during the takeover operation, and the driver can take over the responsibility for manual driving with a high degree of proficiency.

In the present embodiment, as the degree of difficulty in driving on the travel path after the takeover operation has been completed increases, the takeover operation unit 74 hastens the starting time of the takeover operation, or brings the starting point of the takeover operation closer to the host vehicle. In accordance with this feature, it is possible for the TOR to be made earlier as the degree of driving difficulty becomes higher, and therefore, it is possible to lengthen the learning period or the period to become proficient after having switched over to manual driving.

In the present embodiment, the takeover operation unit 74 may set the duration to be shorter as the degree of difficulty in driving on the travel path after having completed the takeover operation increases.

In the case that the level of difficulty in driving the host vehicle 100 on a forward travel path is high, it is expected that such a situation will be handled by the driver in an adaptive case-by-case manner. Thus, in the case that the degree of difficulty in driving on the travel route after having completed the takeover operation is high, the duration of automated driving, which is a basis for determining the timing at which the handover to manual driving takes place, is set to be shorter than the actual duration of automated driving. In accordance with this feature, in the case that the degree of difficulty in driving on the travel route after completion of the takeover operation is high, the probability of transitioning to the takeover operation to manual driving (for example, a takeover operation simultaneously to a steering operation as well as an acceleration/deceleration operation) for cases in which the duration is less than the predetermined time period can be increased.

In the present embodiment, there may further be provided a state detection unit (vehicle interior camera 27) which detects a state of the driver who is occupying a driver's seat, wherein the takeover operation unit 74 sets the starting time or the starting point of the takeover operation on the basis of the state of the driver as detected by the state detection unit. In accordance with this feature, since the starting time or the starting point of the takeover operation can be adjusted depending on the state of the driver who is seated in the driver's seat, it is possible to adjust the period required for the driver to become proficient.

In the present embodiment, if the duration Tk is greater than or equal to the first predetermined time period Ta, the takeover operation unit 74 performs the takeover operation in a stepwise manner with respect to the driver.

In the case that the responsibility for manual driving is handed over to the driver, it is conceivable for the driver to take over the steering operation as well as the acceleration/deceleration operation together. However, in the case of handing over operations in this manner, it takes time for a driver, for whom the duration Tk of automated driving has gone on for a long time, to become accustomed to handling both the steering operation as well as the acceleration/deceleration operation. Thus, by performing the takeover operation to manual driving, for a case in which the duration Tk is greater than or equal to the first predetermined time period Ta, in a stepwise manner with respect to the driver, it is possible for the driver to become proficient with manual driving gradually or step-by-step, and it is possible for the handover of operations to be completed in a shorter time than in the case of handing over both the steering operation and the acceleration/deceleration operation. Moreover, in this instance, proficiency implies becoming accustomed to the operations of one or more objects or tasks, for example, steering and acceleration/deceleration.

In the present embodiment, the takeover operation unit 74 hands over the steering operation to the driver before the acceleration/deceleration operation is handed over to the driver.

With manual driving performed by the driver, it takes time to become proficient with the steering operation. Thus, by handing over the steering operation to the driver prior to handing over the acceleration/deceleration operation, handing over of the acceleration/deceleration operation is carried out at a stage at which the driver has become accustomed to a certain extent with the steering operation. As a result, it is possible to shorten the time required for the driver to become accustomed to the manual operations.

In the present embodiment, when handing over of the steering operation to the driver is performed, in the case that the steering operation is performed by the driver, or in the case that a handover capable state of the steering operation is brought about before a second predetermined time period (planned steering takeover time period) Tb1 has elapsed, the takeover operation unit 74 transitions to handing over of the acceleration/deceleration operation. In accordance with this feature, it is possible for the handover to occur as soon as the driver performs a steering operation during handing over of steering, and it becomes possible for the handover to occur promptly without waiting for the second predetermined time period Tb1 to elapse.

In the present embodiment, when handing over of the steering operation to the driver is performed, in the case that the steering operation is not performed by the driver, or in the case that a handover capable state of the steering operation is not brought about, even though the second predetermined time period Tb1 has elapsed, the takeover operation unit 74 carries out a control to decelerate the vehicle automatically. In accordance with this feature, by automatically decelerating the vehicle at a point in time when handover of the steering operation has not been completed, it is possible to transition into an appropriate vehicle state.

In the present embodiment, the takeover operation unit 74 transitions to handing over of the acceleration/deceleration operation, after handing over of the steering operation to the driver is performed, and after the second predetermined time period Tb1 has elapsed or after the host vehicle 100 has traveled the predetermined distance (planned steering takeover distance) Db1.

After handover of the steering operation to the driver has been carried out, then by the second predetermined time period Tb1 having elapsed, or by the host vehicle 100 having traveled the predetermined distance Db1, the driver is able to become accustomed to the steering operation. By handing over the acceleration/deceleration operation at this stage, it becomes possible for the driver to stably perform both the steering operation and the acceleration/deceleration operation.

In the present embodiment, after handing over of the steering operation to the driver is performed, the takeover operation unit 74 hands over the acceleration/deceleration operation at a stage at which the driver has performed a manual operation of acceleration/deceleration, prior to elapse of the second predetermined time period Tb1, or prior to the host vehicle 100 having traveled the predetermined distance Db1.

After handing over of the steering operation to the driver is performed, manual operation of acceleration/deceleration by the driver prior to elapse of the second predetermined time period Tb1, or prior to the host vehicle 100 having traveled the predetermined distance Db1, serves as a necessary condition for the acceleration/deceleration operation of the host vehicle 100, and therefore, handing over of the acceleration/deceleration operation is brought about even before the second predetermined time period Tb1 has elapsed, or even before the host vehicle 100 has traveled the predetermined distance Db1.

In the present embodiment, the takeover operation unit 74 determines a degree of proficiency of the steering operation that was handed over to the driver, and at a stage at which the driver has become proficient with the steering operation, the takeover operation unit 74 transitions to handing over of the acceleration/deceleration operation. In accordance with this feature, handing over of the acceleration/deceleration occurs at a stage at which the driver has become accustomed to the steering operation, and thus it becomes possible for the driver to stably perform both the steering operation and the acceleration/deceleration operation.

In the present embodiment, the takeover operation unit 74 transitions to handing over of the acceleration/deceleration operation, in the case that a steering speed or a steering acceleration in the steering operation that was handed over to the driver lies within a predetermined range over a predetermined time period.

The case that the steering speed or the steering acceleration in the steering operation that was handed over to the driver lies within the predetermined range over a predetermined time period means a stage at which the driver has become accustomed to the steering operation. Thus, by handing over the acceleration/deceleration operation at this stage, it becomes possible for the driver to stably perform both the steering operation and the acceleration/deceleration operation.

Further, the vehicle control device 10 according to the present embodiment is a vehicle control device 10 adapted to perform a travel control for the host vehicle 100 at least partially automatically, and includes the takeover operation unit 74 that executes operations whereby at least a portion of automated driving is handed over to manual driving performed by the driver, and the continuous travel distance acquisition unit 71 that acquires the continuous travel distance Dk of the automated driving when the at least a portion of the automated driving is handed over to manual driving performed by the driver. In the case that the continuous travel distance Dk is greater than or equal to the first predetermined distance Da, the takeover operation unit 74 performs a takeover operation to hand over driving to manual driving differently from the takeover operation to hand over driving to manual driving in the case that the continuous travel distance Dk is less than the first predetermined distance Da.

When switching over from automated driving to manual driving has taken place, the driver takes over the responsibility for driving operations while grasping the situation around the periphery of the host vehicle 100. As the travel distance (continuous travel distance Dk) during which automated driving is continued becomes longer, it becomes more difficult for the driver to grasp the surrounding situation at the stage at which switching over to manual driving has taken place, and thus there is a concern that it may be difficult for the driver to quickly take over the responsibility for driving operations.

When handing over operations to manual driving, if a certain takeover operation is always executed, a time period from when a takeover request is made with respect to the driver until when manual operations are performed stably by the driver fluctuates corresponding to the length or shortness of the continuous travel distance Dk.

Thus, by setting the takeover operation to manual driving in the case that the continuous travel distance Dk is greater than or equal to the first predetermined distance Da to be different from the takeover operation to manual driving in the case that the continuous travel distance Dk is less than the first predetermined distance Da, it is possible to realize an appropriate takeover operation to manual driving corresponding to the continuous travel distance Dk. As a result, the time period from the time at which the takeover request is made with respect to the driver and until manual operations are performed stably by the driver can be made substantially constant, and the commercial value in relation to such automated driving can be enhanced.

Further, the vehicle control device 10 according to the present embodiment is a vehicle control device 10 adapted to perform a travel control for the host vehicle 100 at least partially automatically, and includes the takeover operation unit 74 that executes operations whereby at least a portion of automated driving is handed over to manual driving performed by the driver, and at least one of the duration acquisition unit 70 that acquires the duration Tk of the automated driving, or the continuous travel distance acquisition unit 71 that acquires the continuous travel distance Dk of the automated driving, when the at least a portion of the automated driving is handed over to manual driving performed by the driver, and wherein the takeover operation unit 74 hastens the handover to manual driving as the duration Tk or the continuous travel distance Dk becomes longer.

In the case that the duration Tk of automated driving or the continuous travel distance Dk of automated driving is long, since there is a possibility of a need to become proficient with manual driving, by hastening the handover to manual driving, for example, when there is a location where the degree of driving difficulty is high after switching over to manual driving, it is possible to become proficient with manual driving before reaching such a location.

The present invention is not limited to the embodiments described above, and it goes without saying that the present invention can be freely modified within a range that does not depart from the essence and gist of the present invention.

What is claimed is:

1. A vehicle control device configured to perform a travel control for a host vehicle at least partially automatically, comprising:
    a takeover operation unit configured to execute operations whereby at least a portion of automated driving is handed over to manual driving performed by a driver; and
    a duration acquisition unit configured to acquire a duration of the automated driving when the at least a portion of the automated driving is handed over to manual driving performed by the driver;
    wherein, in a case that the duration is greater than or equal to a first predetermined time period:
    the takeover operation unit performs a takeover operation to hand over driving to manual driving differently from a takeover operation to hand over driving to manual driving in a case that the duration is less than the first predetermined time period,
    wherein, the takeover operation unit performs the takeover operation in a stepwise manner with respect to the driver, and
    wherein the takeover operation unit hands over a steering operation to the driver before an acceleration/deceleration operation is handed over to the driver.

2. The vehicle control device according to claim 1, wherein, if the duration is greater than or equal to the first predetermined time period, compared to the case that the duration is less than the first predetermined time period, the takeover operation unit hastens a starting time of the takeover operation, or shortens a distance from the host vehicle to a starting point for starting the takeover operation.

3. The vehicle control device according to claim 1, wherein, if the duration is greater than or equal to the first predetermined time period, compared to the case that the duration is less than the first predetermined time period, the takeover operation unit sets a necessary time period required for the takeover operation to be longer.

4. The vehicle control device according to claim 1, wherein, as a degree of difficulty in driving on a travel path after having completed the takeover operation increases, the takeover operation unit hastens a starting time of the takeover operation, or shortens a distance from the host vehicle to a starting point for starting the takeover operation.

5. The vehicle control device according to claim 1, wherein the takeover operation unit sets the duration to be shorter as a degree of difficulty in driving on a travel path after having completed the takeover operation increases.

6. The vehicle control device according to claim 1, further comprising a state detection unit configured to detect a state of the driver who is occupying a driver's seat, wherein the takeover operation unit sets a starting time or a starting point of the takeover operation, based on the state of the driver as detected by the state detection unit.

7. The vehicle control device according to claim 1, wherein, when handing over of the steering operation to the driver is performed, in a case that the steering operation is performed by the driver, or in a case that a handover capable state of the steering operation is brought about, before a second predetermined time period has elapsed, the takeover operation unit transitions to handing over of the acceleration/deceleration operation.

8. The vehicle control device according to claim 7, wherein, when handing over of the steering operation to the driver is performed, in a case that the steering operation is not performed by the driver, or in a case that a handover capable state of the steering operation is not brought about, even though the second predetermined time period has elapsed, the takeover operation unit carries out a control to decelerate the vehicle automatically.

9. The vehicle control device according to claim 1, wherein the takeover operation unit transitions to handing over of the acceleration/deceleration operation, after handing over of the steering operation to the driver is performed, and after a second predetermined time period has elapsed or after the host vehicle has traveled a predetermined distance.

10. The vehicle control device according to claim 1, wherein, after handing over of the steering operation to the driver is performed, the takeover operation unit hands over the acceleration/deceleration operation at a stage at which the driver has performed a manual operation of acceleration/deceleration, prior to elapse of a second predetermined time period, or prior to the host vehicle having traveled a predetermined distance.

11. The vehicle control device according to claim 1, wherein the takeover operation unit determines a degree of proficiency of the steering operation that was handed over to the driver, and at a stage at which the driver has become proficient with the steering operation, transitions to handing over of the acceleration/deceleration operation.

12. The vehicle control device according to claim 1, wherein the takeover operation unit transitions to handing over of the acceleration/deceleration operation, in a case that a steering speed or a steering acceleration in the steering operation that was handed over to the driver lies within a predetermined range over a predetermined time period.

13. A vehicle control device configured to perform a travel control for a host vehicle at least partially automatically, comprising:
    a takeover operation unit configured to execute operations whereby at least a portion of automated driving is handed over to manual driving performed by a driver; and
    a continuous travel distance acquisition unit configured to acquire a continuous travel distance of the automated driving when the at least a portion of the automated driving is handed over to manual driving performed by the driver;
    wherein, in a case that the continuous travel distance is greater than or equal to a first predetermined distance:
    the takeover operation unit performs a takeover operation to hand over driving to manual driving differently from a takeover operation to hand over driving to manual driving in a case that the continuous travel distance is less than the first predetermined distance, the takeover operation unit performs the takeover operation in a stepwise manner with respect to the driver, and the takeover operation unit hands over a steering operation to the driver before an acceleration/deceleration operation is handed over to the driver.

14. A vehicle control device configured to perform a travel control for a host vehicle at least partially automatically, comprising:
   a takeover operation unit configured to execute operations whereby at least a portion of automated driving is handed over to manual driving performed by a driver; and
   a duration acquisition unit configured to acquire a duration of the automated driving when the at least a portion of the automated driving is handed over to manual driving performed by the driver;

wherein the takeover operation unit makes a starting time of a takeover operation on a steering operation and an acceleration/deceleration operation to manual driving in a case of the duration greater than or equal to a first predetermined time period different from a starting time of the takeover operation on the steering operation and the acceleration/deceleration operation to manual driving in a case of the duration less than the first predetermined time period, if the duration is greater than or equal to the first predetermined time period, the takeover operation unit performs the takeover operation in a stepwise manner with respect to the driver, and the takeover operation unit hands over a steering operation to the driver before an acceleration/deceleration operation is handed over to the driver.

* * * * *